(12) United States Patent
Li et al.

(10) Patent No.: US 8,919,655 B2
(45) Date of Patent: Dec. 30, 2014

(54) RADIO FREQUENCY IDENTIFICATION (RFID) TAG AND MANUFACTURING METHODS THEREOF

(75) Inventors: Chen Li, Pudong (CN); Yong Wang, Pudong (CN); Shoumian Chen, Pudong (CN)

(73) Assignee: Shanghai IC R&D Center Co., Ltd, Shanghai (CN)

( * ) Notice: Subject to any disclaimer, the term of this patent is extended or adjusted under 35 U.S.C. 154(b) by 0 days.

(21) Appl. No.: 13/884,969

(22) PCT Filed: Mar. 14, 2011

(86) PCT No.: PCT/CN2011/071756
§ 371 (c)(1),
(2), (4) Date: Nov. 26, 2013

(87) PCT Pub. No.: WO2012/100451
PCT Pub. Date: Aug. 2, 2012

(65) Prior Publication Data
US 2014/0151455 A1    Jun. 5, 2014

(30) Foreign Application Priority Data

Jan. 28, 2011    (CN) .......................... 2011 1 0032448

(51) Int. Cl.
*G06K 19/02*    (2006.01)
*G06K 19/077*    (2006.01)
(52) U.S. Cl.
CPC ...... *G06K 19/07771* (2013.01); *G06K 19/0775* (2013.01); *G06K 19/07775* (2013.01)
USPC ......................................... 235/488; 235/375

(58) Field of Classification Search
CPC ....... G06K 19/02; G06K 19/00; G06K 19/06; G06K 5/00; G06K 17/00; G06K 19/07749; G06K 19/07775; H01L 21/00
USPC .......................................... 235/488, 487, 375
See application file for complete search history.

(56) References Cited

U.S. PATENT DOCUMENTS

| | | | |
|---|---|---|---|
| 8,256,685 B2 * | 9/2012 | Chen et al. ..................... | 235/492 |
| 8,501,573 B2 * | 8/2013 | Roizin et al. .................. | 438/378 |
| 2006/0157798 A1 * | 7/2006 | Hayashi et al. ............... | 257/374 |
| 2006/0163743 A1 * | 7/2006 | Kuwabara et al. ............ | 257/773 |
| 2008/0182362 A1 * | 7/2008 | Andry et al. .................. | 438/113 |
| 2010/0059894 A1 * | 3/2010 | Nguyen Hoang et al. .... | 257/774 |
| 2013/0099006 A1 * | 4/2013 | Hong et al. ................... | 235/492 |
| 2013/0193584 A1 * | 8/2013 | Ding et al. .................... | 257/774 |
| 2013/0207274 A1 * | 8/2013 | Liu et al. ....................... | 257/774 |

FOREIGN PATENT DOCUMENTS

CN    101169837 A    4/2008

* cited by examiner

*Primary Examiner* — Edwyn Labaze (57) ABSTRACT

A radio frequency identification (RFID) device is disclosed. The RFID device includes a silicon substrate having a top side and a bottom side. The RFID device also includes a plurality of circuitry layers formed on the top side of the substrate, and the plurality of circuitry layers include at least a core circuitry and an on-chip antenna. Further, the RFID device includes a plurality of deep openings formed in the substrate on the bottom side under the plurality of circuitry layers. The plurality of deep openings are arranged in an array and through a substantial portion of the substrate, and a remaining portion of the substrate unreached by the plurality of deep openings separates the plurality of deep openings and the plurality of circuitry layers.

29 Claims, 6 Drawing Sheets

RADIO FREQUENCY IDENTIFICATION (RFID) TAG AND MANUFACTURING METHODS THEREOF

CROSS-REFERENCE TO RELATED APPLICATION

This application claims the priority benefit of International Patent Application Serial No. PCT/CN2011/071,756, filed Mar. 14, 2011, which is related to and claims the priority benefit of China patent application serial no. 201110032448.8 filed Jan. 28, 2011. The entirety of each of the above-mentioned patent applications is hereby incorporated by reference herein and made a part of this specification.

FIELD OF THE INVENTION

The present invention generally relates to radio frequency identification (RFID) technologies and, more particularly, to RFID tag devices and the methods for making the RFID tag devices.

BACKGROUND OF THE INVENTION

With progresses in wireless communication and semiconductor technologies, radio frequency identification (RFID) technology has been used in more and more fields to replace some traditional technologies. An RFID system generally includes an RFID tag and an RFID read/write device (i.e., an RFID reader). The RFID tag also includes an antenna to communicate with the RFID reader. Because the cost for the RFID tags is still higher than the traditional bar code tags, large-scale applications of the RFID tags in certain areas, such as in retail business, are still limited. With respect to a total cost of the RFID tag, more than half of the total cost is associated with the antenna of the RFID tag.

The antenna in a traditional RFID tag often is external to the RFID chip, so called the off-chip antenna. Such off-chip antenna may have several disadvantages. For example, such off-chip antenna may be incompatible with current CMOS technology, which may be the main reason why the cost for making the antenna remains high. Also, such off-chip antenna may have a significantly large surface area, which may limit the applications of the RFID tags (such as RFID tags embedded in animals for tracing). Further, such off-chip antenna may increase the uncertainty and instability of an RFID tag system, because the RFID chip needs to be coupled to the antenna using coupling wires. In high-frequency applications, coupling wires may incur parasitic inductance, and the amount of parasitic inductance changes according to the length and angle of the coupling wires. Thus, it may be difficult to precisely control the conditions on the coupling wires during manufacturing process, which may result in undesired reliability.

To solve these problems, on-chip antenna is developed to reduce cost and size of the RFID tags. However, one of the major issues for making the on-chip antenna of a RFID tag is the antenna integration, i.e., creating a high-efficient antenna within a small area of the RFID chip. One of the main limitations of the antenna integration is energy loss on the silicon substrate.

The on-chip antenna is fabricated on the silicon substrate. When the RFID reader reads from or writes to an RFID tag, a portion of the electromagnetic waves from the RFID reader enter into the RFID tag circuitry in the form of energy, and a large portion of that energy enters into the silicon substrate. This may impact operations of the RFID tag circuitry and lower the efficiency of the RFID tag. Such difficulties integrating antenna onto a substrate may be caused by low resistivity, high dielectric constant and low thermal conductivity of an ordinary silicon substrate.

Certain approaches have been reported to try to solve the efficiency issues. For example, Nano Devices and Systems R&D Center in Japan tried proton implantation in the substrate to increase the substrate resistance (A B M H Rashid, S. Watanabe, T. Kikkawa, "High Transmission Gain Integrated Antenna on Extremely High Resistivity Si for ULSI Wireless Interconnect", IEEE Electron Device Letters, December 2002, vol. 23, no. 12, pp. 731-733.); Delft University in Netherlands tried to use a substrate epitaxial layer of high resistivity polysilicon, and to fabricate integrated inductors or antenna on top of the polysilicon (P M Mendes, S. Sinaga, A. Polyakov, "Wafer-Level Integration of On-Chip Antennas and RF Passives Using High-Resistivity Polysilicon Substrate Technology", 2004 Electronic Components and Technology Conference, 2004, pp. 1879-1884.); and also other laboratories tried to deposit a 10 μm thick layer of resin between the ordinary silicon substrate and the antenna to isolate the induced current in the substrate (Hiroshi Abe, Masakazu Sato, Kazuhisa Itoi, "Microwave Operation of On-Chip Antenna Embedded in WL-CSP", IWAT 2005, March 2005, pp. 147-150.). Although these methods can reduce the energy loss of the substrate and increase the RFID tag efficiency to a certain degree, these methods often are incompatible with standard CMOS technology and associated with high cost and complex manufacturing processes. Thus, it may be impractical to use such methods in large-scale industrial productions.

The disclosed methods and systems are directed to solve one or more problems set forth above and other problems.

SUMMARY OF THE INVENTION

One aspect of the present disclosure includes a radio frequency identification (RFID) device. The RFID device includes a silicon substrate having a top side and a bottom side. The RFID device also includes a plurality of circuitry layers formed on the top side of the substrate, and the plurality of circuitry layers include at least a core circuitry and an on-chip antenna. Further, the RFID device includes a plurality of deep openings formed in the substrate on the bottom side under the plurality of circuitry layers. The plurality of deep openings are arranged in an array and through a substantial portion of the substrate, and a remaining portion of the substrate unreached by the plurality of deep openings separates the plurality of deep openings and the plurality of circuitry layers.

Another aspect of the present disclosure includes a method for making a radio frequency identification (RFID) device. The method includes providing a silicon substrate having a top side and a bottom side and fabricating a plurality of circuitry layers including a core circuitry and an on-chip antenna on the top side of the substrate using standard CMOS processes. The method also includes forming a plurality of deep openings in the substrate on the bottom side under the plurality of circuitry layers after the plurality of circuitry layers were fabricated. The plurality of deep openings are arranged in an array and through a substantial portion of the substrate. Further, the method includes separating the plurality of deep openings and the plurality of circuitry layers by a remaining portion of the substrate unreached by the plurality of deep openings.

Another aspect of the present disclosure includes a method for making a radio frequency identification (RFID) device.

The method includes providing a silicon substrate having a top side and a bottom side and forming a plurality of deep openings in the substrate on the bottom side. The plurality of the deep openings are arranged in an array and through a substantial portion of the substrate. The method also includes fabricating a plurality of circuitry layers including a core circuitry and an on-chip antenna on the top side of the substrate above the plurality of deep openings, after the plurality of deep openings were formed, using standard CMOS processes. Further, the method includes separating the plurality of deep openings and the plurality of circuitry layers by a remaining portion of the substrate unreached by the plurality of deep openings.

Other aspects of the present disclosure can be understood by those skilled in the art in light of the description, the claims, and the drawings of the present disclosure.

DETAILED DESCRIPTION OF THE EMBODIMENTS

Reference will now be made in detail to exemplary embodiments of the invention, which are illustrated in the accompanying drawings. Wherever possible, the same reference numbers will be used throughout the drawings to refer to the same or like parts.

Figure 1:
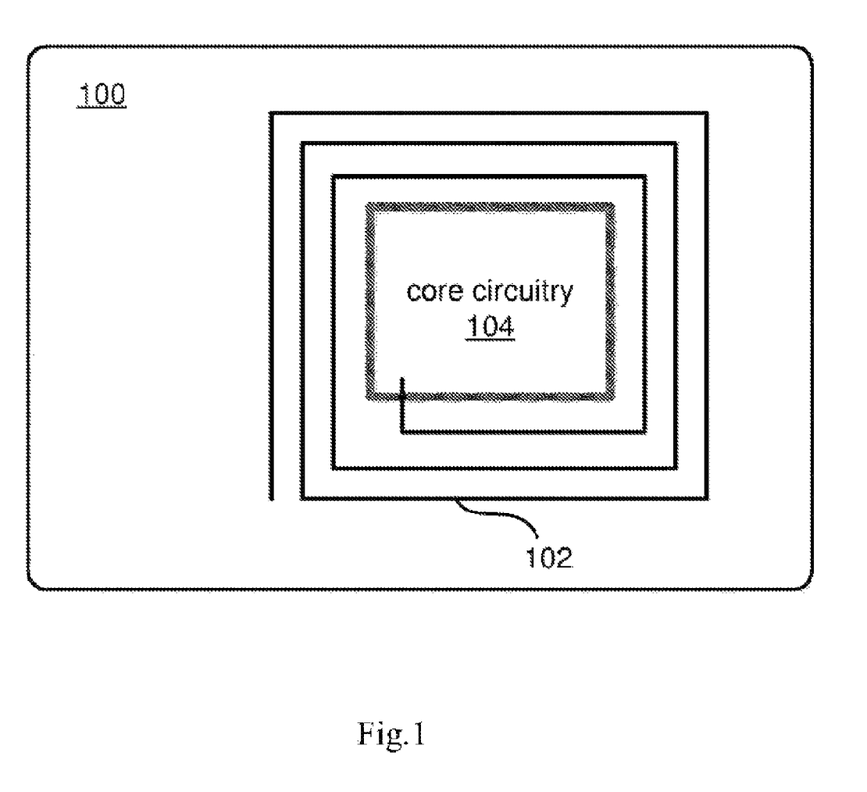
FIG. 1 illustrates an exemplary RFID tag consistent with the disclosed embodiments.

FIG. 1 shows an exemplary RFID tag 100 consistent with the disclosed embodiments. As shown in FIG. 1, RFID tag 100 may include an RFID on-chip antenna 102 and a core circuitry 104. RFID on-chip antenna 102 or on-chip antenna 102 may be directly connected with or coupled with core circuitry 104. Other components and configurations may also be used.

Figure 2:
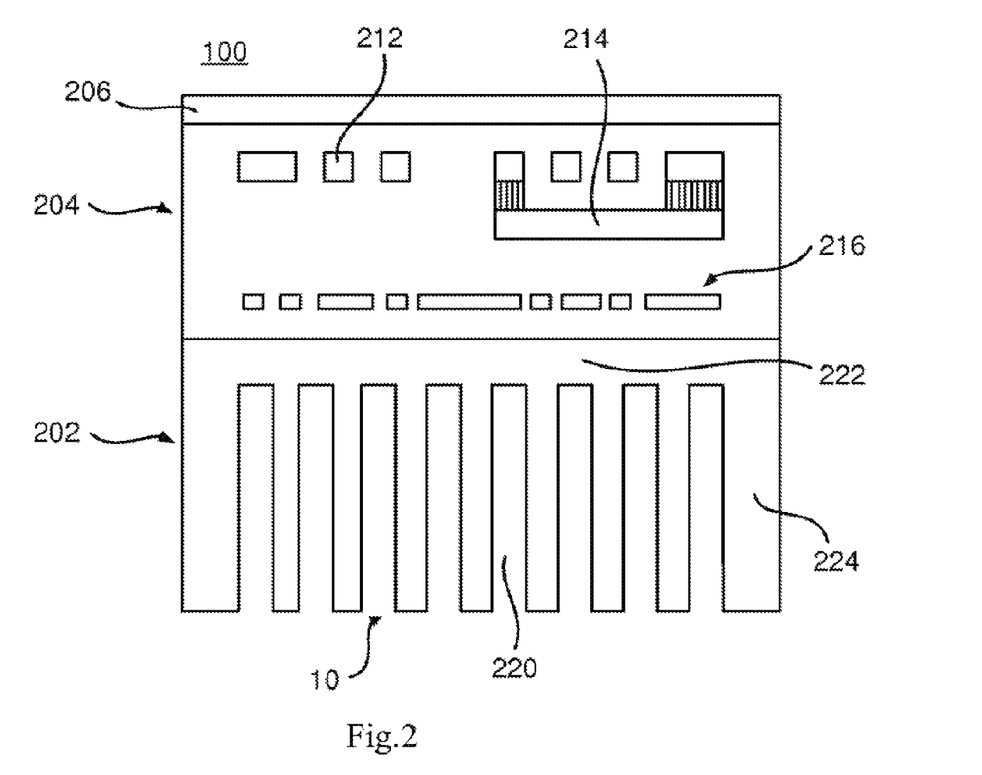
FIG. 2 illustrates a cross-section view of an exemplary RFID tag consistent with the disclosed embodiments.

FIG. 2 shows a cross-section view of exemplary RFID tag 100 consistent with the disclosed embodiments. As shown in FIG. 2, RFID tag 100 may include a substrate 202, a plurality of circuitry layers 204 fabricated on top of the substrate 202, and a passivation layer 206. Circuitry layers 204 may include a top metal layer 212, a sub-top metal layer 214, and a core circuitry area 216. Other layers may also be included.

Top metal layer 212 and/or sub-top metal layer 214 may correspond to on-chip antenna 102, and core circuitry area 216 may correspond to core circuitry 104. Although on-chip antenna 102 comprises top metal layer 212 and sub-top layer 214 for illustrative purposes, on-chip antenna 102 may comprise a single metal layer, two metal layers, or three or more metal layers, depending on particular RFID applications. Further, core circuitry area 216 may also include one or multiple circuit layers.

Further, top metal layer 212 and sub-top metal layer 214 may be placed above core circuitry area 216. In certain embodiments, top metal layer 212 and sub-top metal layer 214 may completely cover core circuitry area 216. In certain other embodiments, top metal layer 212 and sub-top metal layer 214 may overlap with core circuitry area 216 without covering the entire core circuitry area 216. In still certain other embodiments, top metal layer 212 and sub-top metal layer 214 may be placed without any overlapping with core circuitry area 216.

When making RFID tag 100, circuitry layers 204 may be manufactured using standard CMOS manufacturing processes. A standard CMOS manufacturing process, as used herein, may refer to any standard CMOS manufacturing process exists at the time this invention was made, any similar CMOS manufacturing process to the existing CMOS manufacturing, or any CMOS manufacturing process based on similar principles to the existing standard CMOS manufacturing process. Further, top metal layer 212 and sub-top metal layer 214 may also be manufactured using standard CMOS manufacturing processes. Thus, the RFID tag 100 including the on-chip antenna 102 may be manufactured using standard CMOS manufacturing processes.

Substrate 202 may be made from a thin slice of any appropriate semiconductor material, such as silicon, silicon dioxide, aluminum oxide, sapphire, germanium, gallium arsenide (GaAs), or indium phosphide (InP). Substrate 202 may further include a deep opening array 10, a remaining substrate body 222, and side walls 224. When silicon is used for illustrative purposes, substrate 202 may include different types (e.g., p-type or n-type) silicon and/or different types of silicon doping.

Figure 3:
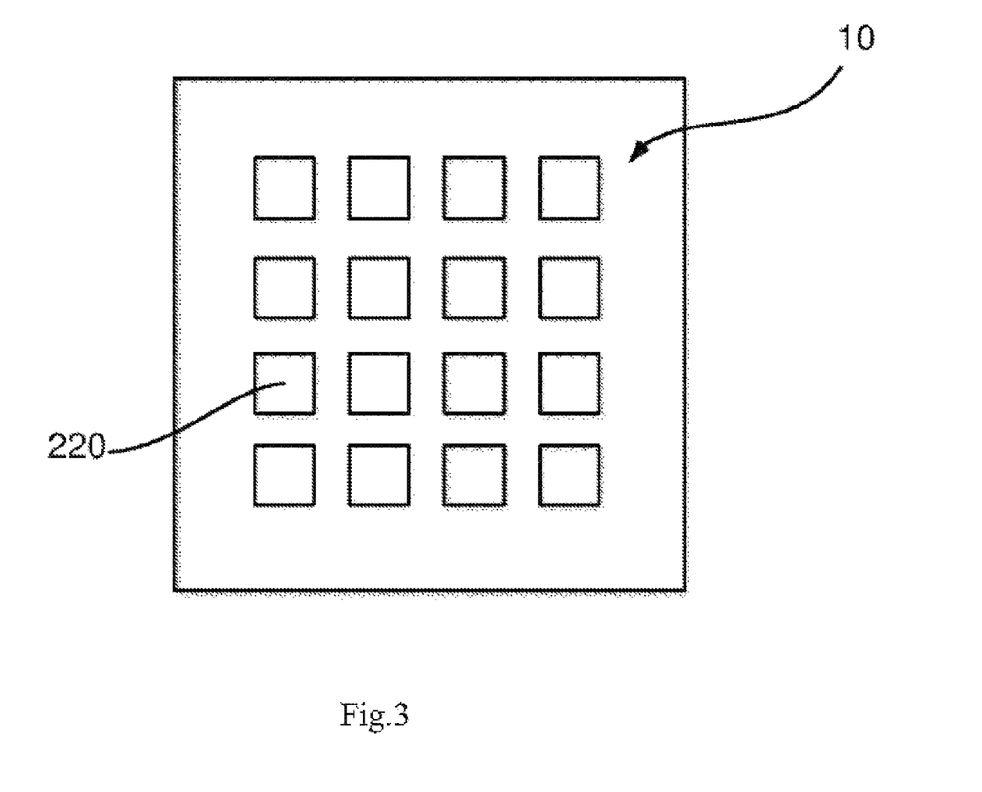
FIG. 3 illustrates rear view of an exemplary RFID tag consistent with the disclosed embodiments.

Deep opening array 10 may include a plurality of deep openings 220. A deep opening of a substrate, as used herein, may refer to an opening on a bottom side of the substrate and through a substantial part of the substrate. The deep opening array 10 may include the plurality of deep openings 220 arranged in an array. The shape of a deep opening (i.e., the cross-section shape) may include any appropriate geometry shape, such as a circle, a square, a rectangle, an oval, or any other shape. FIG. 3 shows an exemplary deep opening array 10 with square-shaped deep openings 220. As shown in FIG. 3, the plurality of deep openings 220 may be arranged in a square area as a 2-dimensional array, i.e., deep opening array 10. Alternatively, the plurality of deep openings 220 may also be arranged in a circle area or other geometrical shapes.

Deep opening array 10 may significantly reduce energy loss at substrate 202. For on-chip antennas, on one hand, a high performance on-chip antenna often requires low substrate energy loss which requires a substrate with a low resistivity, and, on the other hand, common substrates used in manufacturing semiconductor devices have a high resistivity. This apparent conflict may be resolved by the disclosed deep opening array 10. The plurality of deep openings 220 in deep opening array 10 are coupled with the on-chip antenna 102 such that the substrate 202 corresponding to on-chip antenna 102 may have a substantially lower resistivity and energy loss. High performance on-chip antenna 102 may be realized using the standard manufacturing processes based on common substrates.

Returning to FIG. 2, circuitry layers 204 are formed on the top of substrate 202 and deep opening array 10 is formed on the bottom of substrate 202, from an opposite direction. As used herein, a top of the substrate 202 may refer to the side of the substrate 202 to be used to build circuitry, and a bottom of the substrate 202 may refer the other side of the substrate 202 opposite to the side used to build circuitry. That is, deep opening array 10 may be formed under the top metal layer 212 and sub-top metal layer 214 (i.e., on-chip antenna 102) and/or core circuitry area 216 (i.e., core circuitry 104) to reduce energy loss of substrate 202.

Because deep openings are not through holes, the unreached portion of substrate 202 forms remaining substrate body 222. Similarly, the unreached portion along the side of substrate 202 forms side walls 224. In certain embodiments, deep openings 220 of deep opening array 10 may be formed based on inductively coupled plasma (ICP) etching methods, and thus may also be called ICP deep openings. Other methods may also be used.

The size of the cross section of a deep opening may be measured by its diameter. A diameter of the deep opening may refer to a diameter of a circle-shaped deep opening or an equivalent measure of a non-circle-shaped deep opening, such as a largest distance between two points on the cross-section contour of the deep opening. In certain embodiments, the diameter of each or any deep opening may be in a range of approximately 1-10 μm, and preferably at approximately 5 μm, and the spacing among the plurality of deep openings within the deep opening array 10 may be in a range of approximately 1-15 μm, preferably at approximately 5 μm. Alternatively, the spacing among the plurality of deep openings within the deep opening array 10 may also be in a range of approximately 1-10 μm, preferably at approximately 5 μm. Other values may also be used.

The deep openings 220 in deep opening array 10 may be formed using any appropriate dry etching process or other etching methods. For example, as mentioned above, deep openings 220 may be formed using an ICP etching method at a specific diameter. The diameter of the deep openings 220 may be determined based on several factors, such as an easiness of the manufacturing process and mechanical strength of deep opening array 10.

For example, when the diameter is approximately 5 μm, a dry etching process to form deep openings 220 may have a desired selectivity, and the etching process may be easy to implement. Further, the mechanical strength of deep opening array 10 may be practically good. When the diameter is approximately 1 μm, the mechanical strength of deep opening array 10 may be desired, but a high selectivity requirement may cause certain difficulties to implement the etching process. Further, when the diameter is approximately 10 μm, the selectivity requirement is low and it may be easy to implement the etching process. However, due to the relative large diameter, the mechanical strength of deep opening array 10 may be relatively weak comparing to the ones with 1 μm and 5 μm diameters.

In addition, spacing among the plurality of deep openings may also be determined based on certain criteria. For example, when the spacing among the plurality of deep openings in deep opening array is approximately 5 μm, the mechanical strength of deep opening array 10 may be the most practically desired, and the substrate energy loss reduction effect may also be the most practically desired. In comparison, when the spacing is approximately 1 μm, the energy loss reduction effect of the deep openings may be better than the 5 μm spacing, but the mechanical strength may be lower than the 5 μm spacing. Further; when the spacing is approximately 10 μm, the mechanical strength may be higher than the 5 μm spacing, but the energy loss reduction effect of the deep openings may be less desired.

Core circuitry area 216 (i.e., core circuitry 104) may include any appropriate core circuitry, such as rectifier circuits, power management modules, clock generation circuits, reference current source circuits, power switching circuits, modulation and demodulation circuits, memory modules, and digital control modules. Other circuits may also be included.

Further, top metal layer 212 and/or sub-top metal layer 214 used to form on-chip antenna 102 may include metals commonly used in the standard CMOS process, such as aluminum or copper. The on-chip antenna 102 may thus be fabricated using standard CMOS processing steps, such as lithography and etching, and can be connected to the core circuitry 104. The on-chip antenna 102 may also be configured to being wound around the core circuitry 104, and the number of turns and dimension of the winding may be determined based on operating frequency of core circuitry 104. For example, the on-chip antenna 102 may have a total 3 to 4 turns of winding, and a two-dimensional size of approximately 300 μm×300 μm.

Figure 5:
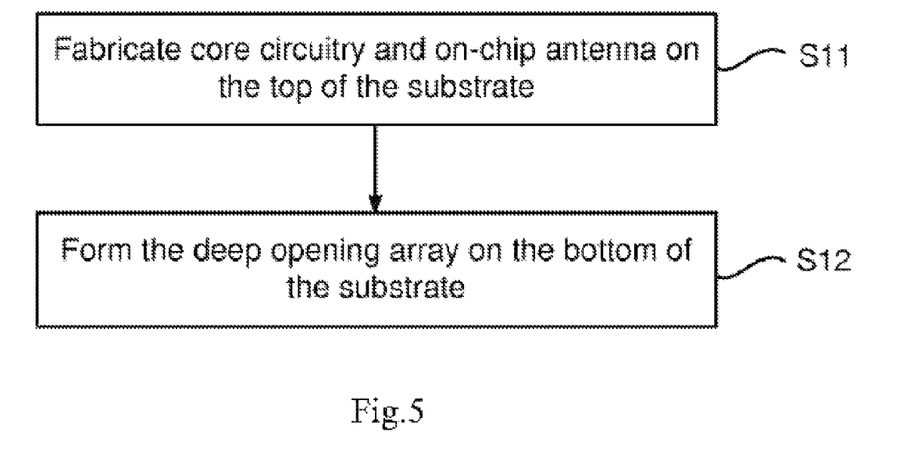
FIG. 5 illustrates an exemplary RFID tag manufacturing process consistent with the disclosed embodiments.

Including on-chip antenna 102 and core circuitry 104 on one side of substrate 202 and deep opening array 10 on the other side of substrate 202, RFID tag 100 may be manufactured in different ways. FIG. 5 illustrates an exemplary manufacturing process consistent with the disclosed embodiments. As shown in FIG. 5, core circuitry area 216 and on-chip antenna 102 (e.g., top metal layer 212 and/or sub-top metal layer 214) are first fabricated on the top of substrate 202 (S11).

More specifically, a proper substrate, such as a p-type silicon substrate with a resistivity of 8 Qcm and a thickness of approximately 200 μm, may be selected as substrate 202. After substrate 202 is selected, one or more standard CMOS processes may be used to fabricate core circuitry 104 (i.e., core circuitry area 216) of RFID tag 100 and the on-chip antenna 102 (e.g., top metal layer 212 and/or sub-top metal layer 214) on the top of substrate 202. That is, circuitry layers 204 are fabricated on top of substrate 202. The on-chip antenna 102 may be wound around core circuitry 104 (e.g., as described in FIG. 1), and the core circuitry 104 may include various circuits, such as a front-end circuitry for communicating with an RFID reader including rectifier circuits, power management modules, clock generation circuits, reference current source circuits, power switching circuits, and modulation and demodulation circuits, and other auxiliary circuits, such as memory modules and digital control modules.

After the circuitry layers 204 are fabricated on the top of substrate 202, or a substantial part of the circuitry layers 204 are fabricated, the deep opening array 10 is formed on the bottom of the substrate 202 (S12). For example, on the bottom of substrate 202 and within the area under the on-chip antenna 102, a plurality of deep openings 220 of deep opening array 10 may be formed by using ICP backside etching. That is, the substrate 202 is etched using an ICP selective etching method to form the plurality of deep openings 220 at the backside of the substrate 202 having the core circuitry 104 and the on-chip antenna 102 (e.g., FIG. 3). Thus, an RFID tag 100 with an ICP deep opening array may have been manufactured.

More specifically, the silicon layer of deep opening array 10 (the portion of substrate 202 containing deep openings) may be formed by directionally etching original substrate 202 using the plasma generated from RF-powered-magnetic-field-ionized etching gas. Active ions of the plasma, assisted by physical collision energy, react chemically with the substrate 202 to form volatile substances to achieve ICP etching. The etched area, often on the opposite side of the on-chip antenna 102, may be same as the on-chip antenna area, for example, at approximately 300 μm×300 μm, or slightly larger than the on-chip antenna area, for example, at approximately 350 μm×350 μm.

For a silicon substrate 202, the thickness of silicon substrate generally is in a range of approximately 100 µm-1000 µm. The thickness of the substrate layer of deep opening array 10 may thus be determined based on the thickness of the substrate 202 on which deep opening array 10 is formed. For example, the thickness of remaining substrate body may be set in a range of approximately 1 µm-40 µm and preferably at approximately 5 µm. Thus, the thickness of the substrate layer of deep opening array 10 may be determined using the thickness of the remaining substrate body 222.

On the other hand, the thickness of the remaining substrate body 222 (i.e., the distance between the top of deep opening array and the top of substrate 202) may be determined based on the type and size of core circuitry 104 and/or the on-chip antenna 102. In certain embodiments, the thickness of the remaining substrate body 22 is determined using certain techniques such as simulation.

The remaining substrate body 222 not only protects the surface of substrate 202 (and thus the circuitry layers 204) from being etched during the ICP etching process forming the deep opening array 10, but also ensures the substrate 202 does not impact on performance characteristics of the core circuitry 104 and the on-chip antenna 102. Thus, a small value of the thickness of the remaining substrate body 222 may lead to difficulties to further fabricate the circuitry layers 204, while a large value of the thickness of the remaining substrate body 222 may be ineffective to suppress substrate crosstalk and unable to form desired high impedance on the top of substrate 202. But in general, a thickness of approximately 5 µm may satisfy most types of core circuitry and/or on-chip antenna 102. Other values may also be used.

Figure 4:
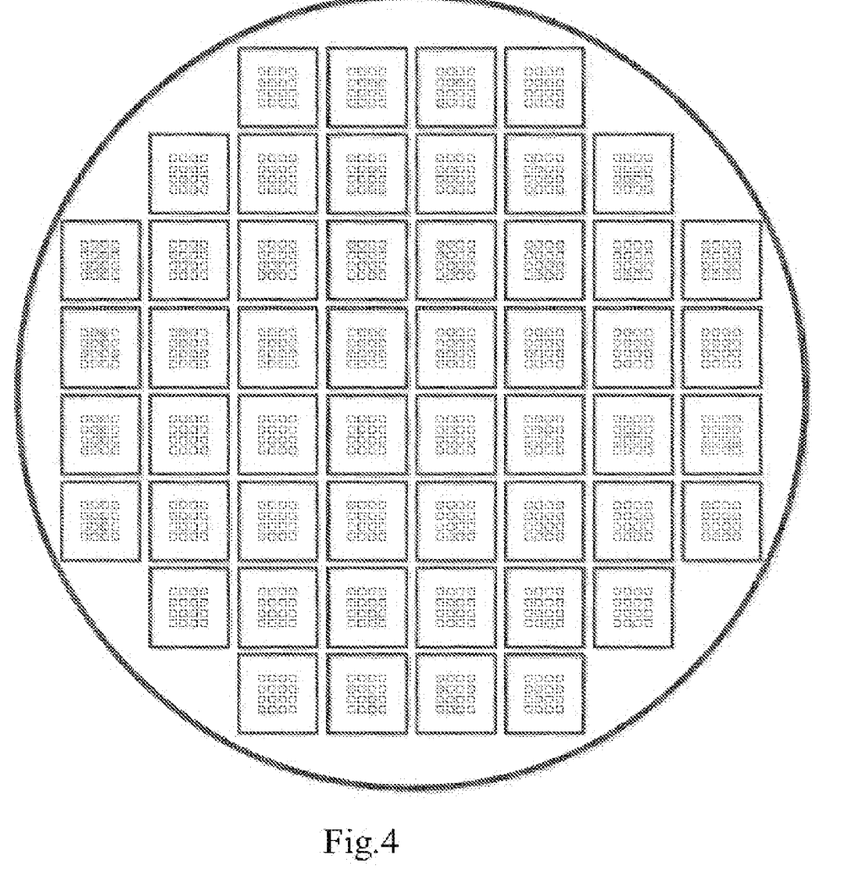
FIG. 4 illustrates an exemplary arrangement of RFID tag dies on a wafer consistent with the disclosed embodiments.

In addition, during the manufacturing process, for substrates with different resistivity values under the same particular ICP etching conditions, etching depth per unit time (i.e., etching rate) may vary for the different substrates. But for substrates with a same given resistivity under the same particular ICP etching conditions, the etch rate may be constant for different substrates. Thus, the thickness of remaining substrate body 222 may be controlled by controlling the time performing the ICP etching on the bottom of the substrate 202 to form deep opening array 10. Thus, for the substrate 202 with a 200 µm thickness, the substrate layer of deep opening array 10 may be set as approximately 195 µm, and the remaining substrate body 222 may be set as approximately 5 µm. Multiple dies or substrate 202 may be arranged on a single wafer during the manufacturing process, as shown in FIG. 4.

The manufactured RFID tag 100 may be configured to use a frequency of up to 900 MHz at a distance of 1-250 mm. Further, the on-chip antenna 102 may include 3 turns (wounds) and the dimension for the on-chip antenna 102 may be, for example, approximately 200 µm×200 µm.

Figure 6:
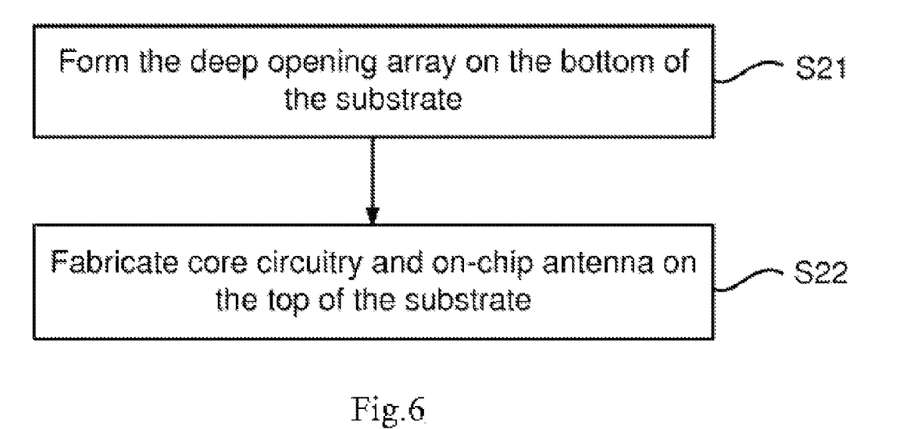
FIG. 6 illustrates another exemplary RFID tag manufacturing process consistent with the disclosed embodiments.

FIG. 6 illustrates another exemplary manufacturing process consistent with the disclosed embodiments. As shown in FIG. 6, the deep opening array 10 is first formed on the bottom of the substrate 202 (S21). S21 may be similarly performed to S12 in FIG. 5, and a detailed description of S21 is omitted. Further, after the deep opening array 10 is formed, core circuitry area 216 and on-chip antenna 102 (e.g., top metal layer 212 and/or sub-top metal layer 214) are fabricated on the top of substrate 202 (S22), which is similar to Si 1 in FIG. 5.

Figure 7A:
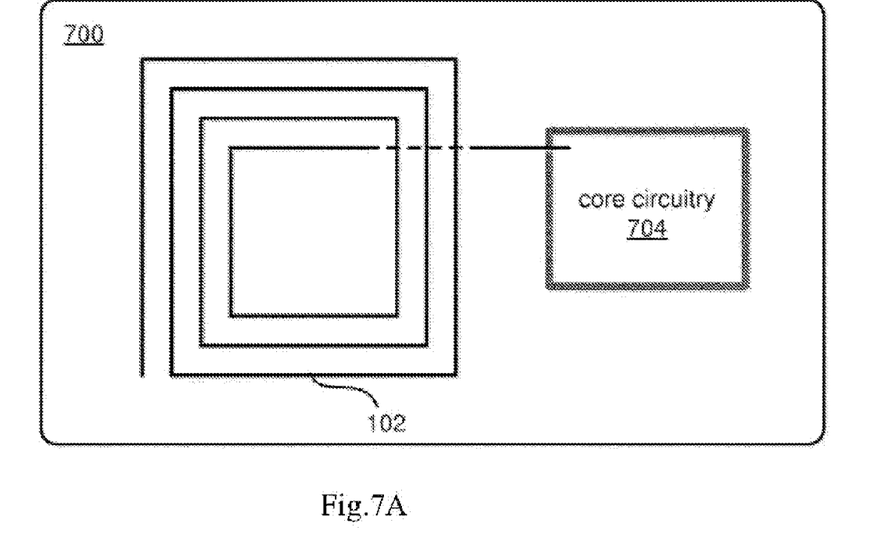
FIG. 7A illustrates an exemplary RFID tag consistent with the disclosed embodiments.

FIG. 7 illustrates an exemplary RFID tag 700 consistent with the disclosed embodiments. Similar to RFID tag 100 in FIG. 1, as shown in FIG. 7, RFID tag 700 includes an on-chip antenna 102 and a core circuitry 704, and on-chip antenna 102 connects or couples with core circuitry 704. However, core circuitry 704 is located in an area different from the area of on-chip antenna 102 on substrate 202.

Figure 7B:
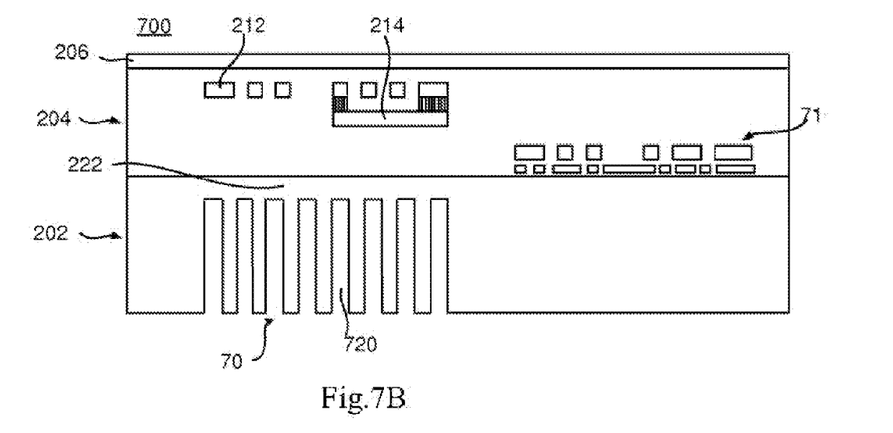
FIG. 7B illustrates a cross-section view of another exemplary RFID tag consistent with the disclosed embodiments.

FIG. 7B illustrates a cross-section view of RFID tag 700 consistent with the disclosed embodiments. As shown in FIG. 7B, similar to RFID tag 100, RFID tag 700 may include a substrate 202, a plurality of circuitry layers 204 fabricated on top of the substrate 202, and a passivation layer 206. Circuitry layers 204 may include a top metal layer 212, a sub-top metal layer 214, and a core circuitry area 716. Other layers may also be included.

Top metal layer 212 and/or sub-top metal layer 214 may correspond to on-chip antenna 102, and core circuitry area 716 may correspond to core circuitry 704, which may include various circuits such as rectifier circuits, power management modules, clock generation circuits, reference current source circuits, power switching circuits, modulation and demodulation circuits, memory modules, and digital control modules. Further, core circuitry area 716 may be located in an area of the substrate 202 without overlapping with on-chip antenna 102.

Substrate 202 may further include a deep opening array 70 including a plurality of deep openings 720 and a remaining substrate body 222. Deep opening array 70 may be formed by using a reactive ion etching (RIE) process, instead of using the ICP etching process described previously, on the bottom of substrate 202. Further, deep opening array 70 may be formed directly under the on-chip antenna 102. Other configurations may also be used.

During manufacturing, circuitry layers 204 including the on-chip antenna 102 and core circuitry 704 may be fabricated using standard CMOS processes. For example, on-chip antenna 102 may be made on the top of a properly selected substrate 202, such as a p-type silicon substrate, and made from a common metal material, such as aluminum or copper. Further, on-chip antenna 102 may be fabricated using a standard CMOS process, such as lithography or etching.

The on-chip antenna 102 is also connected to the core circuitry 704. Further, the on-chip antenna 102 may be wound into a certain number of turns. The number of wounds and dimension of on-chip antenna 102 may be based on the RF frequency of RFID tag 700. For example, a total number of 5 turns and a dimension of 400 µm×400 µm may be set for on-chip antenna 102. Other values may also be used.

More specifically, when manufacturing RFID 700, core circuitry 704 and the on-chip antenna 102 may be fabricated on the top of substrate 202, and then the deep opening array 70 is formed on the bottom of substrate 202 using an RIE process. The wafer containing substrate 202 may be placed directly on the power electrode inside an RIE chamber, and the chamber wall may have neutral electrodes to increase the effective area, which may also increase the voltage difference between the plasma and the power electrode and the kinetic energy of reactive ions of the plasma. The RIE process is selected for forming the deep opening array 70 because, comparing to wet etching methods, RIE may have certain advantages.

For example, in the RIE process, the plasma can be easily started and ended, and the plasma is not sensitive to small changes in temperature of the silicon substrate. Also, the RIE is highly anisotropic and is thus highly directional and able to produce substantially vertical etched walls. Further, the deep opening array 70 may be formed in an area corresponding to the area of the on-chip antenna 102. For example, the area of deep opening array 70 may be the same as the area of the on-chip antenna 102 (e.g., 400 µm×400 µm), or the area of deep opening array 70 may be slightly larger than the area of the on-chip antenna 102 (e.g., 450 µm×450 µm).

It is understood that, although ICP deep openings and RIE deep openings are described in separate embodiments, components and processes in different embodiments may be exchanged or mixed when appropriate. For example, deep opening array 10 or deep opening array 70 may include both ICP deep openings and RIE deep openings. Different configurations are obvious to those skilled in the art.

The disclosed systems and methods may provide many advantageous RFID tag devices and applications. By using the disclosed systems and methods, RFID tags with integrated on-chip antenna can be used in a wide range of applications. The disclosed systems and methods provide a fundamental solution to substrate energy loss of RFID antennas and substantially reduce chip area of the RFID tags, which may also reduce power consumption. Other advantages and applications are obvious to those skilled in the art.

Although the present invention has been disclosed as above with respect to the preferred embodiments, they should not be construed as limitations to the present invention. Various modifications and variations can be made by the ordinary skilled in the art without departing the spirit and scope of the present invention. Therefore, the protection scope of the present invention should be defined by the appended claims.

The invention claimed is:

1. A radio frequency identification (RFID) device, comprising:
a silicon substrate having a top side and a bottom side;
a plurality of circuitry layers formed on the top side of the substrate, wherein the plurality of circuitry layers include a core circuitry and an on-chip antenna;
wherein the silicon substrate comprises a remaining portion and a plurality of unfilled blind deep openings formed under the remaining portion in the silicon substrate within the area under the core circuitry and/or the on-chip antenna;
wherein the plurality of unfilled blind deep openings formed in the substrate are arranged in an array and extend from the bottom side to the remaining portion which separates the plurality of unfilled blind deep openings and the core circuitry and/or the on-chip antenna.

2. The RFID device according to claim 1, wherein:
the plurality of unfilled blind deep openings are formed under the on-chip antenna, and an area containing the plurality of unfilled blind deep openings correspond to an area of the on-chip antenna.

3. The RFID device according to claim 2, wherein:
the core circuitry does not overlap with the on-chip antenna.

4. The RFID device according to claim 1, wherein:
the on-chip antenna connects with the core circuitry and is wound around the core circuitry, and
a total number of turns is determined by a frequency operated by the RFID device.

5. The RFID device according to claim 1, wherein:
the plurality of unfilled blind deep openings are formed using at least one of an inductively coupled plasma (ICP) etching method and a reactive ion etching (RIE) method.

6. The RFID device according to claim 1, wherein:
a thickness of the remaining portion of the substrate is in a range of approximately 1 µm-40 µm.

7. The RFID device according to claim 6, wherein:
the thickness of the remaining portion of the substrate is approximately 5 µm.

8. The RFID device according to claim 1, wherein:
a diameter of each of the plurality of unfilled blind deep openings is in a range of approximately 1 µm-10 µm.

9. The RFID device according to claim 8, wherein:
the diameter of each of the plurality of unfilled blind deep openings is approximately 5 µm.

10. The RFID device according to claim 1, wherein:
spacing among the plurality of unfilled blind deep openings is in a range of approximately 1 µm-10 µm.

11. The RFID device according to claim 10, wherein:
the spacing among the plurality of unfilled blind deep openings is approximately 5 µm.

12. A method for making a radio frequency identification (RFID) device, comprising:
providing a silicon substrate having a top side and a bottom side;
fabricating a plurality of circuitry layers including a core circuitry and an on-chip antenna on the top side of the substrate using standard CMOS processes;
forming a plurality of unfilled blind deep openings in the silicon substrate within the area under the core circuitry and/or the on-chip antenna from the bottom side after the plurality of circuitry layers were fabricated, wherein the plurality of unfilled blind deep openings are arranged in an array and are separated from the core circuitry and/or the on-chip antenna by a remaining portion of the substrate.

13. The method according to claim 12, wherein unfilled blind forming the deep openings further includes:
forming the plurality of unfilled blind deep openings under the on-chip antenna in an area corresponding to an area of the on-chip antenna.

14. The method according to claim 12, wherein forming the unfilled blind deep openings further includes:
forming the plurality of deep openings using at least one of an inductively coupled plasma (ICP) etching method and a reactive ion etching (RIE) method.

15. The method according to claim 14, further including:
controlling a thickness of the remaining portion of the substrate in a range of approximately 1 µm-40 µm based on an etching rate of the substrate.

16. The method according to claim 15, wherein:
the thickness of the remaining portion of the substrate is approximately 5 µm.

17. The method according to claim 12, wherein:
a diameter of each of the plurality of unfilled blind deep openings is in a range of approximately 1 µm-10 µm.

18. The method according to claim 17, wherein:
the diameter of each of the plurality of unfilled blind deep openings is approximately 5 µm.

19. The method according to claim 12, wherein:
spacing among the plurality of unfilled blind deep openings is in a range of approximately 1 µm-10 µm.

20. The method according to claim 19, wherein:
the spacing among the plurality of unfilled blind deep openings is approximately 5 µm.

21. A method for making a radio frequency identification (RFID) device, comprising:
providing a silicon substrate having a top side and a bottom side;
forming a plurality of unfilled blind deep openings in the silicon substrate from the bottom side, wherein the plurality of unfilled blind deep openings are arranged in array;
fabricating a plurality of circuitry layers including a core circuitry and an on-chip antenna on the top side of the substrate by using standard CMOS processes after the plurality of unfilled blind deep openings were formed;
wherein the core circuitry and/or the on-chip antenna are fabricated within the area above the plurality of unfilled blind deep openings and are separated from the plurality of blind deep openings onion of the substrate.

22. The method according to claim 21, wherein forming the unfilled blind deep openings further includes:
   forming the plurality of unfilled blind deep openings in an area on the bottom side of the substrate corresponding to an area of the on-chip antenna.

23. The method according to claim 21, wherein forming the unfilled blind deep openings further includes:
   forming the plurality of unfilled blind deep openings using at least one of an inductively coupled plasma (ICP) etching method and a reactive ion etching (RIE) method.

24. The method according to claim 21, further including:
   controlling a thickness of the remaining portion of the substrate in a range of approximately. 1 μm-40 μm based on an etching rate of the substrate.

25. The method according to claim 24, wherein:
   the thickness of the remaining portion of the substrate is approximately 5 μm.

26. The method according to claim 21, wherein:
   a diameter of each of the plurality of unfilled blind deep openings is in a range of approximately 1 μm-10 μm.

27. The method according to claim 26, wherein:
   the diameter of each of the plurality of unfilled blind deep openings is approximately 5 μm.

28. The method according to claim 21, wherein:
   spacing among the plurality of unfilled blind deep openings is in a range of approximately 1 μm-10 μm.

29. The method according to claim 28, wherein:
   the spacing among the plurality of unfilled blind deep openings is approximately 5 μm.

* * * * *